(12) United States Patent
Sekizuka

(10) Patent No.: US 11,447,049 B2
(45) Date of Patent: Sep. 20, 2022

(54) VEHICLE SEAT STRUCTURE

(71) Applicant: Toyota Jidosha Kabushiki Kaisha, Toyota (JP)

(72) Inventor: Makoto Sekizuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 435 days.

(21) Appl. No.: 16/590,739

(22) Filed: Oct. 2, 2019

(65) Prior Publication Data

US 2020/0108747 A1 Apr. 9, 2020

(30) Foreign Application Priority Data

Oct. 4, 2018 (JP) .............................. JP2018-189314

(51) Int. Cl.
*B60N 2/427* (2006.01)
*B60R 21/207* (2006.01)
*B60R 21/233* (2006.01)

(52) U.S. Cl.
CPC ........ *B60N 2/42745* (2013.01); *B60R 21/207* (2013.01); *B60R 21/233* (2013.01)

(58) Field of Classification Search
CPC .............. B60N 2/42745; B60N 21/207; B60N 2/0276; B60N 2/4228
See application file for complete search history.

(56) References Cited

U.S. PATENT DOCUMENTS

| | | | |
|---|---|---|---|
| 6,398,299 B1 * | 6/2002 | Angerer ................. | B60N 2/809 297/216.12 |
| 9,102,252 B2 * | 8/2015 | Sugiyama .............. | B60N 2/986 |
| 9,889,771 B2 * | 2/2018 | Ohno .................... | B60R 21/207 |
| 10,166,888 B2 * | 1/2019 | Sugiyama .............. | B60N 2/72 |
| 2016/0288752 A1 | 10/2016 | Stancato et al. | |
| 2017/0008480 A1 * | 1/2017 | Ohno .................... | B60N 2/665 |

FOREIGN PATENT DOCUMENTS

| | | | | |
|---|---|---|---|---|
| DE | 102011122416 A1 * | 9/2012 | ........... | B60N 2/4228 |
| DE | 102011056672 A1 * | 6/2013 | ........... | B60N 2/4235 |
| JP | H11-342822 A | 12/1999 | | |
| JP | 2001-047918 A | 2/2001 | | |
| JP | 2005-335616 A | 12/2005 | | |
| JP | 2007-015466 A | 1/2007 | | |
| JP | 2007-176350 A | 7/2007 | | |
| JP | 2014085084 A * | 5/2014 | ............... | B60N 2/24 |
| JP | 2016-055705 A | 4/2016 | | |
| JP | 2016-210405 A | 12/2016 | | |

* cited by examiner

*Primary Examiner* — Faye M Fleming
(74) *Attorney, Agent, or Firm* — Dinsmore & Shohl LLP

(57) ABSTRACT

A vehicle seat structure includes a vehicle seat including a seat cushion and a seatback, and a pushing apparatus provided inside the seatback at a predetermined height. The pushing apparatus includes a pushing portion that, at a time of a vehicle collision in which an occupant sitting on the vehicle seat moves to a seat forward side, pushes a portion of a seat front face of the seatback to the seat forward side.

9 Claims, 9 Drawing Sheets

VEHICLE SEAT STRUCTURE

CROSS-REFERENCE TO RELATED APPLICATION

This application claims priority under 35 USC 119 from Japanese Patent Application No. 2018-189314 filed Oct. 4, 2018, the disclosure of which is incorporated by reference herein in its entirety.

BACKGROUND

Technical Field

The present disclosure relates to a vehicle seat structure.

Related Art

Japanese Patent Application Laid-Open (JP-A) No. 2005-335616 discloses an invention relating to an occupant protection device for a vehicle. In this occupant protection device, a front face of a seatback is a surface that supports the pelvis area of an occupant. A portion of the front face includes a lumbar support that is capable of projection to a seat forward side. A projection amount of this lumbar support to the seat forward side can be altered by altering an activation amount of a motor connected to a control device. The control device is connected to a collision predictor. When a collision is predicted, the lumbar support is activated. In the structure described above, at a time of vehicle collision, the lumbar support is activated in a direction that improves occupant protection performance in accordance with a collision direction. Thus, occupant protection performance is improved.

JP-A No. 2016-055705 also discloses an invention relating to an occupant protection device for a vehicle. In this occupant protection device for a vehicle, an auxiliary airbag apparatus is incorporated in a rear end portion of a seat cushion of a vehicle seat. At a time of a vehicle frontal collision (below referred to as a front collision), the auxiliary airbag inflates and expands toward a seat upper side. As a result, the upper body of an occupant sitting on the vehicle seat is lifted up by the auxiliary airbag. Therefore, the upper body of the occupant may be corrected to an appropriate sitting posture and the occupant may be restrained.

SUMMARY

However, in the structure disclosed in JP-A No. 2005-335616, because the lumbar support is activated by a motor, the lumbar support may not be activated instantaneously at the time of a vehicle collision; activation is limited to situations in which a collision can be predicted on the basis of a collision predictor. As an improvement, correcting the posture of the upper body of an occupant with an airbag that may be activated instantaneously at the time of a vehicle collision, as in the structure disclosed in JP-A No. 2016-055705, can be considered. However, if there is no gap for inflation and expansion of an airbag between the occupant and the seatback, the airbag may not inflate and expand appropriately. Furthermore, in order to prevent the phenomenon of submarining, in which the posture of an occupant sinks into a seat cushion during a front collision, it is desirable to put the pelvis bone of the occupant into a forward-tilted posture and make a lap belt of a seatbelt less likely to slide off the pelvis. However, in the structure disclosed in JP-A No. 2016-055705, because the airbag inflates and expands toward the seat upper side from the seat cushion and the lower portion (the pelvis bone) of the pelvis area of an occupant is first push to the seat forward side, it is difficult to put the pelvis bone into a forward-tilted posture. There is a room for improvement of the related art described above in regard to this problem.

In consideration of the circumstances described above, the present disclosure provides a vehicle seat structure that may effectively protect an occupant during a vehicle collision.

A vehicle seat structure according to a first aspect of the present disclosure includes a vehicle seat and a pushing apparatus. The vehicle seat includes a seat cushion and a seatback. The pushing apparatus is provided inside the seatback at a predetermined height. The pushing apparatus includes a pushing portion that, at a time of a vehicle collision in which an occupant sitting on the vehicle seat moves to a seat forward side, pushes a portion of a seat front face of the seatback to the seat forward side.

According to the first aspect, the vehicle seat structure includes the pushing apparatus in the vehicle seat. The pushing apparatus is provided at the predetermined height at the interior of the seatback. At the time of a vehicle collision in which an occupant sitting on the vehicle seat moves to the seat forward side (below referred to simply as "during a forward movement collision"), the pushing apparatus pushes the portion of the seat front face of the seatback, which is a portion of a surface that supports the pelvis area of the occupant, to the seat forward side. Thus, during a forward movement collision, the pushing portion of the pushing apparatus may push an upper portion of the pelvis area of the occupant to the seat forward side and may cause the pelvis bone of the occupant to tilt forward. Therefore, a lap belt of a seatbelt is made less likely to slide off the pelvis bone and submarining may be suppressed.

In a vehicle seat structure according to a second aspect of the present disclosure, in the first aspect, the pushing apparatus includes a rod member and an inflator. The pushing portion is capable of pushing the portion of the seat front face of the seatback to the seat forward side at a usual time. In a case in which gas is supplied from the inflator that is activated at the time of the vehicle collision, the rod member moves to the seat forward side and causes the pushing portion to push the portion of the seat front face of the seatback further to the seat forward side than at the usual time.

According to the vehicle seat structure of the second aspect, the pushing portion of the pushing apparatus is capable of pushing the seat front face of the seatback to the seat forward side at usual times. Therefore, the pushing apparatus may support the pelvis area of the occupant sitting on the vehicle seat in an appropriate sitting posture with the pushing portion at usual times. During a forward movement collision, the pushing portion provided at the predetermined height pushes the portion of the seat front face of the seatback further to the seat forward side than at usual times, via the rod member that moves to the seat forward side when gas is supplied from the inflator. Therefore, during a forward movement collision, the pushing portion may push the upper portion of the pelvis area of the occupant to the seat forward side. Thus, the pelvis bone of the occupant may be tilted forward and the lap belt of the seatbelt may be made less likely to slide off the pelvis. As a result, submarining may be suppressed.

In a vehicle seat structure according to a third aspect of the present disclosure, in the first aspect, the pushing apparatus includes an airbag and an inflator. The pushing portion is capable of pushing the portion of the seat front face of the seatback to the seat forward side at a usual time. In a case in which gas is supplied from the inflator that is activated at the time of the vehicle collision, the airbag inflates and expands in the seatback and causes the pushing portion to push the portion of the seat front face of the seatback further to the seat forward side than at the usual time.

According to the vehicle seat structure of the third aspect, the pushing portion of the pushing apparatus is capable of pushing the seat front face of the seatback to the seat forward side at usual times. Therefore, the pushing apparatus may support the pelvis area of the occupant sitting on the vehicle seat in an appropriate sitting posture with the pushing portion at usual times. During a forward movement collision, the pushing portion of the pushing apparatus provided at the predetermined height pushes the portion of the seat front face of the seatback further to the seat forward side than at usual times, via the airbag that inflates and expands in the seatback when gas is supplied from the inflator. Therefore, during a forward movement collision, the pushing portion may push the upper portion of the pelvis area of the occupant to the seat forward side. Thus, the pelvis bone of the occupant may be tilted forward and the lap belt of the seatbelt may be made less likely to slide off the pelvis. As a result, submarining may be suppressed.

In a vehicle seat structure according to a fourth aspect of the present disclosure, in the first aspect, the pushing apparatus includes an airbag as the pushing portion, and the airbag inflates and expands in the seatback when gas is supplied thereto from an inflator that is activated at the time of the vehicle collision.

According to the vehicle seat structure of the fourth aspect, the inflator activates during a forward movement collision, and the airbag of the pushing apparatus is supplied with gas from the inflator and inflates and expands in the seatback. As a result, the inflating and expanding airbag of the pushing apparatus provided at the predetermined height pushes the portion of the seat front face of the seatback to the seat forward side. Therefore, during a forward movement collision, the airbag may push the upper portion of the pelvis area of the occupant to the seat forward side. Thus, the pelvis bone of the seat occupant may be tilted forward, the lap belt of the seatbelt may be made less likely to slide off the pelvis, and submarining may be suppressed.

In a vehicle seat structure according to a fifth aspect of the present disclosure, in the fourth aspect, a rupture portion is provided at a portion of the seat front face of the seatback, the portion corresponds with the height of the pushing apparatus, the rupture portion cleaves when pushed by the airbag during the inflation and expansion, and the airbag emerges through the rupture portion to the seat forward side of the seatback during the inflation and expansion.

According to the vehicle seat structure of the fifth aspect, the rupture portion is provided at the portion of the seat front face of the seatback corresponding with the height of the pushing apparatus. The rupture portion is cleaved by being pushed by the airbag during the inflation and expansion. During the inflation and expansion, the airbag emerges through the rupture portion to the seat forward side of the seatback. As a result, the inflating and expanding airbag directly pushes the upper portion of the pelvis area of the occupant to the seat forward side. Thus, because the airbag pushes the pelvis area of the occupant directly without the seat front face of the seatback being interposed, a displacement amount (stroke) of the pelvis area when pushing against the pelvis area may be increased. Therefore, because a movement amount of the pelvis area of the occupant during the pushing may be increased, the pelvis bone of an occupant sitting in a relaxed state in which the seatback is greatly reclined may be returned to a state close to a driving posture. That is, the pelvis bone of the occupant in the relaxed state is moved in a forward-tilting direction, the lap belt of the seatbelt is made less likely to slide off the pelvis, and submarining may be suppressed.

In a vehicle seat structure according to a sixth aspect of the present disclosure, in the fourth aspect or the fifth aspect, the airbag includes a first airbag and a second airbag. The first airbag and second airbag are disposed to oppose one another substantially in a seat front-and-rear direction prior to the inflation and expansion. The first airbag is provided at a seat rear side of a seat spring that is provided in the seatback and extends in a seat width direction, and the second airbag is provided at the seat forward side of the seat spring.

According to the vehicle seat structure of the sixth aspect, the airbag includes the first airbag and the second airbag. Prior to inflation and expansion, the first airbag is provided at the seat rear side of the seat spring provided in the seatback. The second airbag is provided at the seat forward side of the seat spring, opposing the first airbag substantially in the seat front-and-rear direction. Therefore, when the first airbag inflates and expands, the second airbag inflates and expands in a state in which the second airbag is displaced to the seat forward side via the seat spring. Hence, a displacement amount during the pushing of the upper portion of the pelvis area of the occupant may be increased further. Because the movement amount of the pelvis area of the occupant during the pushing may be further increased, the pelvis bone of an occupant sitting in the relaxed state may be returned to a state even closer to the driving posture. That is, the pelvis bone of the occupant in the relaxed state may be moved greatly in the forward-tilting direction, the lap belt of the seatbelt is made less likely to slide off the pelvis, and submarining may be suppressed.

The vehicle seat structure according to the first aspect provides an effect in that an occupant may be protected effectively during a forward movement collision.

The vehicle seat structures according to the second aspect and the third aspect provide effects in that the pelvis area of an occupant may be supported appropriately at usual times and the occupant may be protected effectively during a forward movement collision.

The vehicle seat structure according to the fourth aspect provides an effect in that an occupant may be protected effectively during a forward movement collision by a simple structure.

The vehicle seat structures according to the fifth aspect and the sixth aspect provide effects in that an occupant sitting on the vehicle seat in a relaxed state may be protected effectively during a forward movement collision.

DETAILED DESCRIPTION

First Exemplary Embodiment

Figure 1:
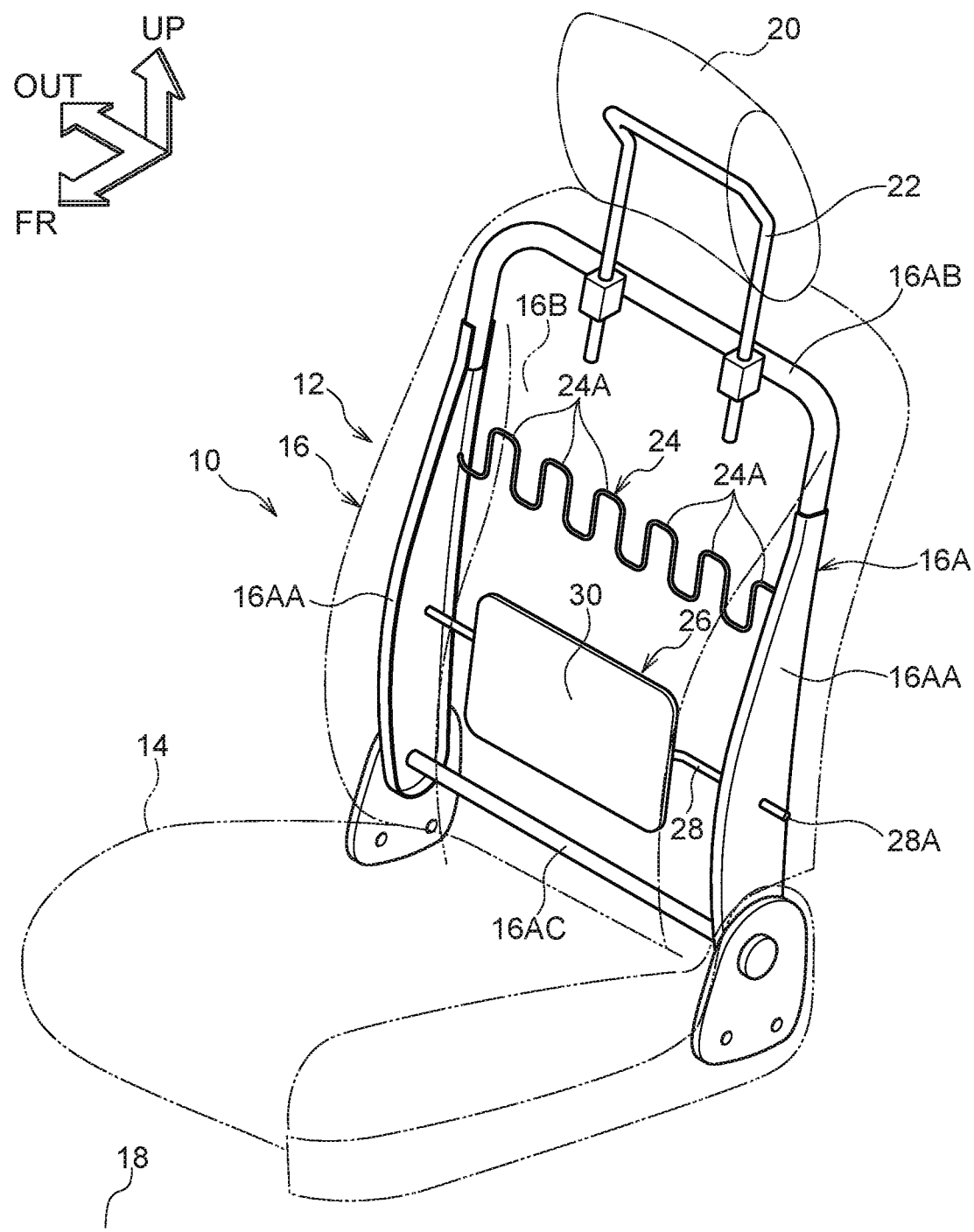
FIG. 1 is a schematic perspective view showing a framework structure of a vehicle seat including a vehicle seat structure according to a first exemplary embodiment.
Figure 2:
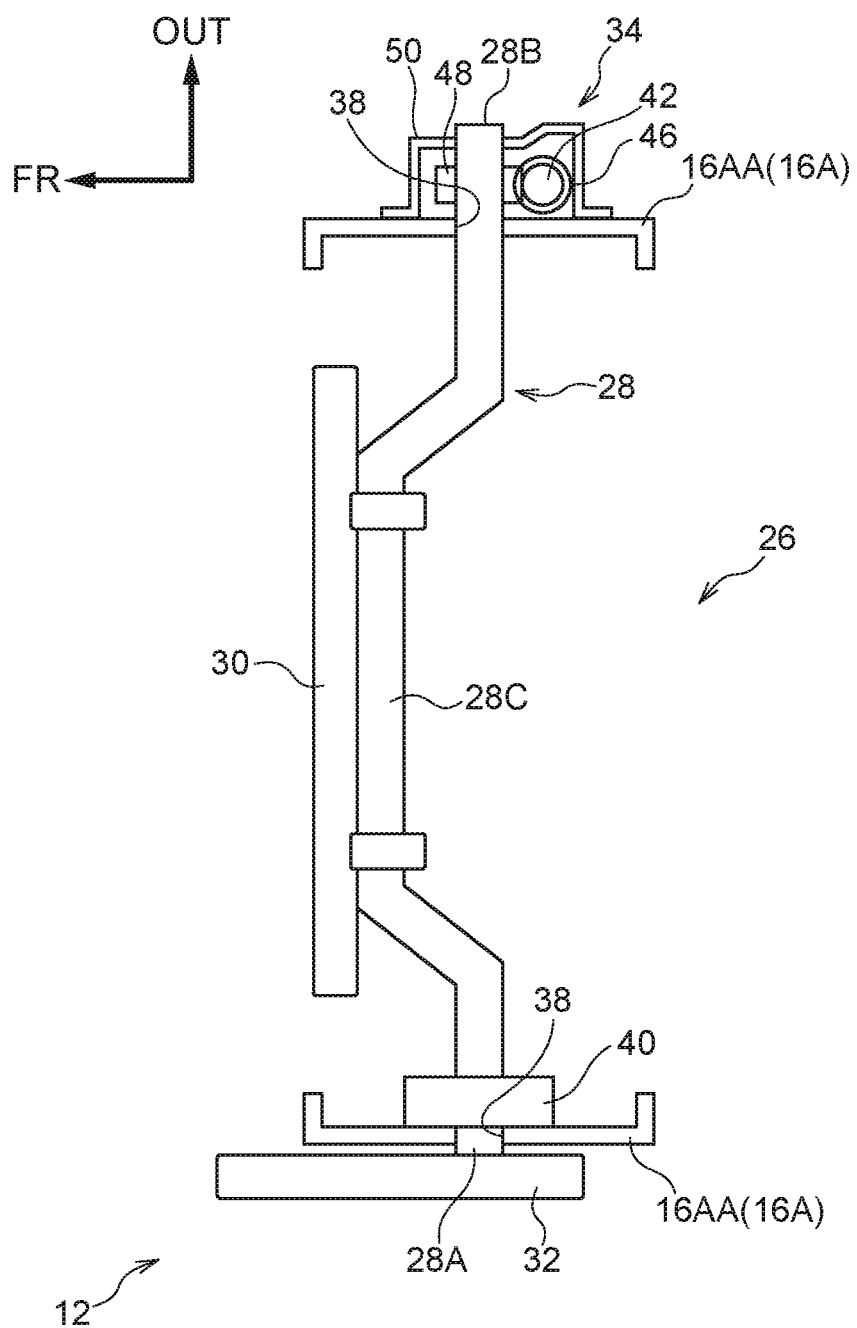
FIG. 2 is a magnified sectional view showing a state in which principal elements of the vehicle seat structure according to the first exemplary embodiment are cut in a horizontal direction.
Figure 3:
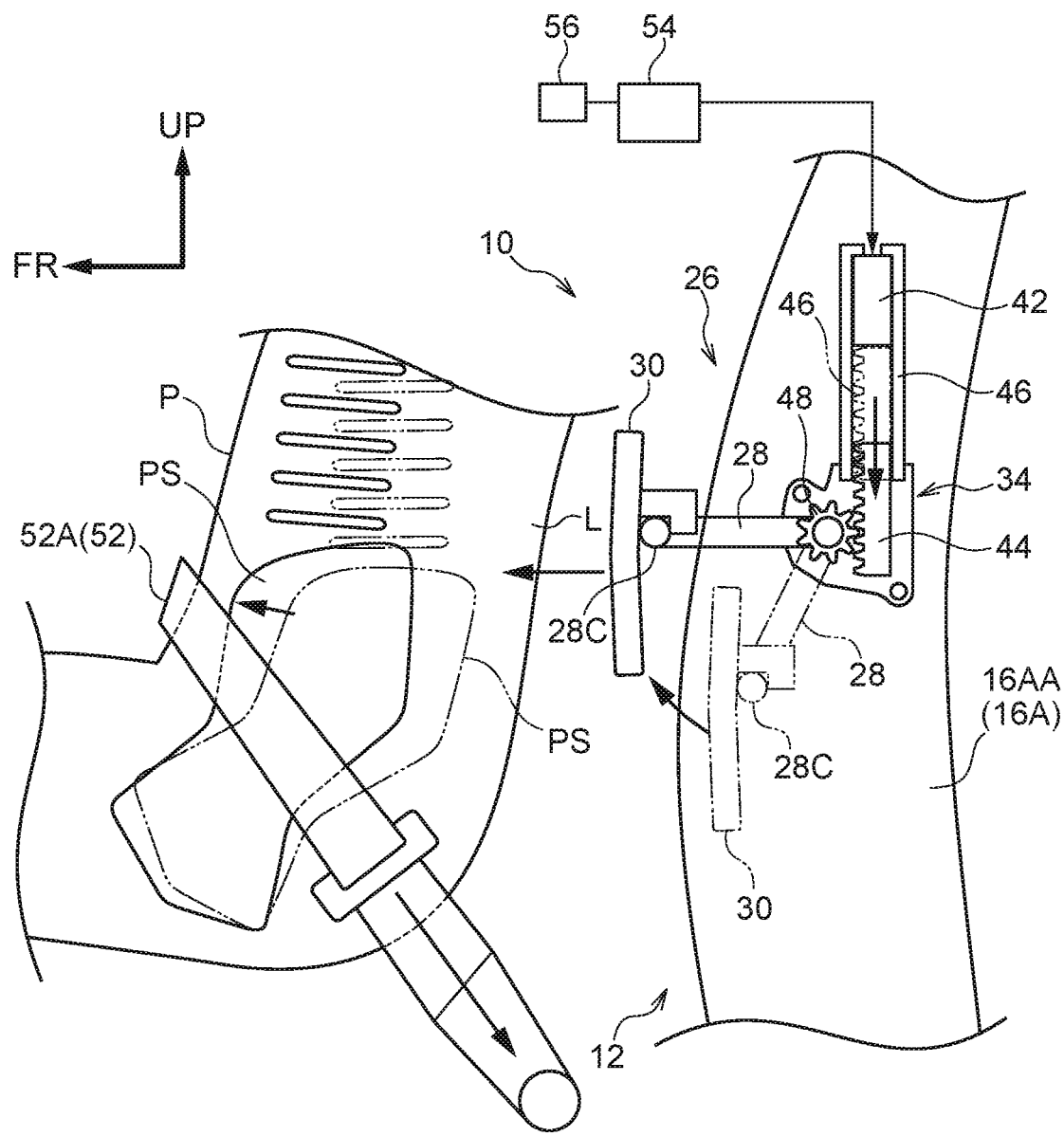
FIG. 3 is a schematic side view showing an operational state of the vehicle seat structure according to the first exemplary embodiment during a forward movement collision.

A first exemplary embodiment of the vehicle seat structure according to the present disclosure is described using FIG. 1 to FIG. 3. An arrow FR that is shown where appropriate in these drawings indicates a seat forward side, an arrow UP indicates a seat upper side, and an arrow OUT indicates a seat width direction outer side. In the present exemplary embodiment, the seat forward side, seat width direction outer side and seat upper side substantially correspond with, respectively, a vehicle forward side, vehicle width direction outer side and vehicle upper side.

—Overall Structure—

FIG. 1 shows a framework structure of a vehicle seat 12 featuring a vehicle seat structure 10 according to the present exemplary embodiment. The vehicle seat 12 includes a seat cushion 14 and a seatback 16. An occupant P (see FIG. 3) sits on the seat cushion 14. The seat cushion 14 is attached to a vehicle floor 18 via seat rails, which are not shown in the drawings. The seat cushion 14 incorporates a seat cushion frame, which is a framework member that is not shown in the drawings.

A seatback frame 16A is provided at the seat rear side of the seat cushion frame, via a reclining mechanism that is not shown in the drawings. The seatback frame 16A serves as a framework member of the seatback 16, which supports a pelvis area L of an occupant P sitting on the seat cushion 14 from the seat rear side. The seatback frame 16A is formed in a substantially rectangular frame shape in a vehicle front view. More specifically, the seatback frame 16A includes a left and right pair of side frames 16AA, an upper frame 16AB that links upper ends of the side frames 16AA with one another substantially in the seat width direction, and a lower frame 16AC that links lower ends of the side frames 16AA with one another substantially in the seat width direction.

A headrest 20 is attached to the upper frame 16AB via a headrest frame 22. The headrest 20 supports the head area of the occupant P sitting on the vehicle seat 12 from the seat rear side.

A plural number of seat springs 24 are provided inside the seatback frame 16A. In FIG. 1, only one of the seat springs 24 is shown, to facilitate understanding of the inside of the seatback frame 16A. Each seat spring 24 is structured by, for example, a spring wire fabricated of metal. The seat spring 24 extends in the seat width direction and meanders in the seat vertical direction. The seat springs 24 support a cushion member, which is not shown in the drawings, and provide resilience to a seat front face 16B of the seatback 16.

A seatbelt 52 is attached to the vehicle body in the vicinity of the vehicle seat 12 (see FIG. 3). The seatbelt 52 is a widely known mechanism that is worn by the occupant P. Accordingly, the seatbelt 52 is not described here. In a state in which the seatbelt 52 is worn, a portion of the seatbelt 52 between a tongue and a shoulder anchor (neither of which is shown in the drawings) restrains the upper body of the occupant P, and a portion of the seatbelt 52 between the tongue and an anchor member, which is not shown in the drawings, serves as a lap belt 52A that restrains the pelvis area L of the occupant P.

—Lumbar Support Mechanism—

A lumbar support mechanism 26 that serves as a pushing apparatus is provided at a predetermined height at the seatback frame 16A, and therefore at the interior of the seatback 16. The lumbar support mechanism 26 includes a lumbar rod 28, a lumbar plate 30 that serves as a pushing portion, a first lumbar mechanism 32 (see FIG. 2) and a second lumbar mechanism 34 (see FIG. 2). The first lumbar mechanism 32 and the second lumbar mechanism 34 are not shown in FIG. 1, in order to facilitate understanding of the relationship between the lumbar rod 28 and the side frames 16AA. The lumbar rod 28 is formed in a circular rod shape whose length direction is substantially in the seat width direction. Seat width direction end portions 28A and 28B (see FIG. 2) of the lumbar rod 28 are inserted into, respectively, a left and right pair of insertion holes 38 (see FIG. 2). The insertion holes 38 are formed at the side frames 16AA, penetrating therethrough in the seat width direction. The end portions 28A and 28B are inserted so as to protrude to seat width direction outer sides beyond the respective side frames 16AA. The meaning of the term "predetermined height" at which the lumbar support mechanism 26 is disposed in the seatback 16, is intended to include, for example, a position from which, when the lumbar plate 30 of the lumbar support mechanism 26 moves to the seat forward side, the lumbar plate 30 pushes against an upper region of a pelvis bone PS of the pelvis area L of the occupant P (see FIG. 3).

As shown in FIG. 2, an inflected portion 28C is formed at a substantially central portion of the lumbar rod 28 in the seat width direction, so as to protrude to the seat forward side in a vehicle plan view. The lumbar plate 30 is attached to the inflected portion 28C of the lumbar rod 28 so as to be rotatable about an axial direction that is along an extension direction of the lumbar rod 28. The lumbar plate 30 is formed in a substantially rectangular plate shape in a seat front view, with a longer direction in the seat width direction and a thickness direction in the seat front-and-rear direction (see FIG. 1). The lumbar plate 30 is relatively rotatable with respect to the lumbar rod 28 such that the thickness direction of the lumbar plate 30 is substantially fixed in the seat front-and-rear direction even when the lumbar rod 28 rotates (see FIG. 3).

The first lumbar mechanism 32 is provided at a position of an outer side face of, for example, the side frame 16AA that is at an inner side in the vehicle width direction, which position corresponds with the insertion hole 38. The first lumbar mechanism 32 includes a brake and a stopper (neither of which is shown in the drawings). The end portion 28A of the lumbar rod 28 that protrudes from the insertion hole 38 is inserted inside the first lumbar mechanism 32. Rotation of the lumbar rod 28 may be restricted by the brake and the stopper. Thus, the position of the lumbar plate 30 may be moved by the lumbar rod 28 being rotated by an activating member, which is not shown in the drawings, and the position of the lumbar plate 30 may be preserved by the brake. Therefore, a position at which the lumbar plate 30 may appropriately support the pelvis area L of the occupant P (see FIG. 3) may be preserved. That is, the lumbar support mechanism 26 may appropriately support the pelvis area L of the occupant P from the seat rear side thereof at usual (usage) times. When the inflected portion 28C of the lumbar rod 28 rotates toward the seat upper side, the stopper restricts rotation of the lumbar rod 28 such that the lumbar rod 28 does not rotate further toward the seat upper side than a substantially horizontal direction (see the solid lines in FIG. 3).

A flange member 40 is attached to a portion of the lumbar rod 28 corresponding to the seat width direction inner side of the side frame 16AA at which the first lumbar mechanism 32 is provided. The flange member 40 has a larger diameter dimension than the insertion hole 38. Therefore, the flange member 40 suppresses displacement of the lumbar rod 28 to the seat width direction inner side.

The second lumbar mechanism 34 is provided at a position at the outer side of the side frame 16AA that is at the outer side in the vehicle width direction, which position corresponds to the insertion hole 38. As shown in FIG. 3, the second lumbar mechanism 34 includes an inflator 42, a rack gear 44, a gear pipe 46, a pinion gear 48 and a gear cover 50 (see FIG. 2). The inflator 42 is formed in a long, thin, circular rod shape whose length direction is substantially in the seat vertical direction. The inflator 42 is provided at the seat upper side of the interior of the hollow gear pipe 46, which is fixed to the side frame 16AA by a bracket that is not shown in the drawings. Plural gas-jetting holes, which are not shown in the drawings, are formed in a lower end portion of the inflator 42. The interior of the inflator 42 is charged with, for example, a gas generating agent. When the inflator 42 is activated, the gas generating agent ignites and generates a large volume of gas, and the gas is jetted out through the gas-jetting holes.

The rack gear 44 is fabricated of resin and is formed substantially in a circular rod shape with a slightly smaller diameter than the gear pipe 46. The rack gear 44 is inserted into the vehicle lower side of the gear pipe 46 (see the two-dot chain lines in FIG. 3). Gear teeth are formed at the seat forward side of the rack gear 44. When the inflator 42 generates the gas, the rack gear 44 inside the gear pipe 46 is instantaneously pushed out to the seat lower side by the pressure of the gas.

The pinion gear 48 is fabricated of resin and is attached to the end portion 28B of the lumbar rod 28 that protrudes to the seat width direction outer side from the insertion hole 38 (see FIG. 2). When the pinion gear 48 is rotated, the lumbar rod 28 rotates. Gear teeth are formed at an outer periphery face of the pinion gear 48. The gear teeth fit together with the rack gear 44 that receives gas pressure from the inflator 42 and moves to the seat lower side. Therefore, when the pinion gear 48 is rotated by the rack gear 44 moving toward the seat lower side, the lumbar rod 28 rotates in the clockwise direction of FIG. 3. As a result, the lumbar plate 30 moves to the seat forward side and, via a cushion member and seat cover provided at the seat forward side of the seatback 16, which are not shown in the drawings, pushes the pelvis area L of the occupant P sitting on the vehicle seat 12 to the seat forward side.

As shown in FIG. 2, the gear cover 50 is provided so as to cover the pinion gear 48, the gear pipe 46 and the like from the seat width direction outer side thereof. Consequently, interference of the pinion gear 48, the rack gear 44 moving from inside the gear pipe 46 and the like with other members, such as the cushion member that is not shown in the drawings, is suppressed.

As illustrated in FIG. 3, activation of the lumbar support mechanism 26 described above is controlled by a controller 54. An input side of the controller 54 is connected to, for example, a front airbag sensor 56. The front airbag sensor 56 is disposed at a front side member that is not shown in the drawings and suchlike. The front airbag sensor 56 principally detects a frontal impact such as a full-overlap collision, an offset collision or the like. The output side of the controller 54 is connected to the inflator 42 of the lumbar support mechanism 26.

—Operation and Effects of the First Exemplary Embodiment—

Now, operation and effects of the first exemplary embodiment are described.

In the present exemplary embodiment, as shown in FIG. 3, the vehicle seat structure 10 includes the lumbar support mechanism 26 in the vehicle seat 12. The lumbar support mechanism 26 is provided at the predetermined height at the interior of the seatback 16 (see FIG. 1). During a forward movement collision (i.e., during a vehicle front collision in the present exemplary embodiment), the lumbar plate 30 pushes a portion of the front face 16B of the seatback 16, and hence a portion of a braced surface of the pelvis area L of the occupant P to the seat forward side. That is, the lumbar plate 30 may push an upper portion of the pelvis area L of the occupant P to the seat forward side during a forward movement collision, and the lumbar plate 30 may cause the pelvis bone PS of the occupant P to tilt forward. Consequently, the lap belt 52A of the seatbelt 52 is made less likely to slide off the pelvis bone PS, and submarining may be suppressed. Therefore, the occupant P may be protected effectively during a forward movement collision.

The lumbar plate 30 is capable of pushing the front face 16B of the seatback 16 to the seat forward side at usual times. Therefore, at usual times, the lumbar support mechanism 26 may support the pelvis area L of the occupant P sitting on the vehicle seat 12 in an appropriate sitting posture with the lumbar plate 30. In contrast, when gas is supplied from the activated inflator 42 during a forward movement collision, the lumbar plate 30 pushes the portion of the front face 16B of the seatback 16 to the seat forward side. Therefore, the lumbar plate 30 may push the upper portion of the pelvis area L of the occupant P to the seat forward side during the forward movement collision. Thus, the pelvis bone PS of the occupant P may be tilted forward and the lap belt 52A of the seatbelt 52 may be made less likely to slide off the pelvis bone PS. As a result, submarining may be suppressed. Therefore, the pelvis area L of the occupant P may be appropriately supported at usual times and the occupant P may be protected effectively during a forward movement collision.

The present exemplary embodiment has a structure in which the rack gear 44 and pinion gear 48 are each fabricated of resin and the pinion gear 48 is mounted directly to the lumbar rod 28, but this is not limiting. The rack gear 44 and pinion gear 48 may each be fabricated of metal, and a clutch mechanism that absorbs an impact when the rack gear 44 and pinion gear 48 abut together may be provided between the pinion gear 48 and the lumbar rod 28.

Further, the present exemplary embodiment has a structure in which the rack gear 44 that receives the pressure of gas from the inflator 42 fits together with the pinion gear 48, but this is not limiting. A structure is possible in which a ball or alternative member that receives the pressure of gas from the inflator 42 fits together with the pinion gear 48 and causes the pinion gear 48 to rotate.

Second Exemplary Embodiment

A vehicle seat structure according to a second exemplary embodiment of the present disclosure is described below using FIG. 4. Structural portions that are the same as in the first exemplary embodiment described above are assigned the same reference symbols, and descriptions thereof are not given.

A vehicle seat structure 70 according to the second exemplary embodiment is similar in basic structure to the first exemplary embodiment, but differs in that the lumbar plate 30 is moved via an airbag 72.

—Lumbar Support Mechanism—

Figure 4:
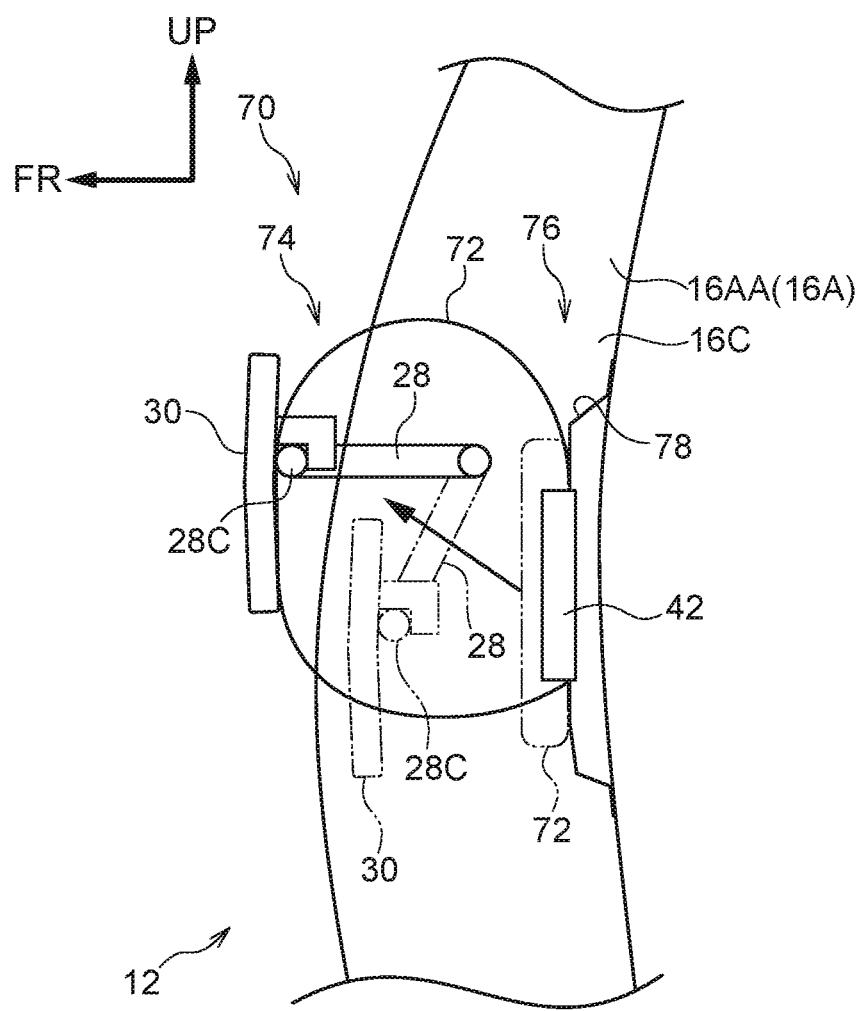
FIG. 4 is a schematic side view showing an operational state of a vehicle seat structure according to a second exemplary embodiment during a forward movement collision.

As shown in FIG. 4, a lumbar support mechanism 74 that serves as the pushing apparatus is provided at a predetermined height at the seatback frame 16A, and therefore the interior of the seatback 16 (see FIG. 1). The lumbar support mechanism 74 includes the lumbar rod 28, the lumbar plate 30, the first lumbar mechanism 32 (see FIG. 2) and a second lumbar mechanism 76. The meaning of the term "predetermined height" at which the lumbar support mechanism 74 is disposed in the seatback 16, is intended to include, for example, a position from which, when the lumbar plate 30 of the lumbar support mechanism 74 moves to the seat forward side, the lumbar plate 30 pushes against the upper region of the pelvis bone PS of the pelvis area L of the occupant P (see FIG. 3).

The second lumbar mechanism 76 is provided between the left and right pair of side frames 16AA. The second lumbar mechanism 76 includes a counterforce plate 78, the inflator 42 and the airbag 72. The counterforce plate 78 extends so as to link seat rear portions 16C of the left and right pair of side frames 16AA with one another in the seat width direction. In a seat side view, the counterforce plate 78 is formed in a hat shape in cross section that protrudes to the seat forward side.

The inflator 42 is formed in a long, thin, circular rod shape whose length direction is substantially in the seat vertical direction. The inflator 42 is attached substantially at the middle in the seat vertical direction of the counterforce plate 78 by a bracket that is not shown in the drawings.

The airbag 72 is fixed to the counterforce plate 78 in a state in which the airbag 72 is folded up and the inflator 42 is accommodated inside the airbag 72 (see the two-dot chain lines in FIG. 4). Because the airbag 72 is disposed at the seat rear side of the lumbar plate 30, when the inflator 42 generates gas, the inflected portion 28C of the lumbar rod 28 is pushed by the airbag 72 inflating and expanding as indicated by the arrow in FIG. 4, and the inflected portion 28C rotates to the seat forward side about the axial direction that is extension direction of the lumbar rod 28 (see the solid lines in FIG. 4). As a result, the lumbar plate 30 moves to the seat forward side. Via the cushion member and seat cover provided at the seat forward side of the seatback 16, which are not shown in the drawings, the lumbar plate 30 pushes the pelvis area L of the occupant P sitting on the vehicle seat 12 (see FIG. 3) to the seat forward side.

Operation and Effects of the Second Exemplary Embodiment

Now, operation and effects of the second exemplary embodiment are described.

Because the structure described above is similar to the vehicle seat structure 10 according to the first exemplary embodiment except in the matter of the lumbar plate 30 being moved via the airbag 72, similar effects to the first exemplary embodiment are provided. In addition, the lumbar plate 30 of the lumbar support mechanism 74 is capable of pushing the front face 16B of the seatback 16 to the seat forward side at usual times. Therefore, at usual times, the lumbar support mechanism 74 may support the pelvis area L of the occupant P sitting on the vehicle seat 12 in an appropriate sitting posture with the lumbar plate 30. In contrast, when gas is supplied from the activated inflator 42 during a forward movement collision, via the airbag 72 inflating and expanding in the seatback 16, the lumbar plate 30 pushes the portion of the front face 16B of the seatback 16 to the seat forward side. Therefore, the lumbar plate 30 may push the upper portion of the pelvis area L of the occupant P to the seat forward side during the forward movement collision. Thus, the pelvis bone PS of the occupant P may be tilted forward and the lap belt 52A of the seatbelt 52 may be made less likely to slide off the pelvis bone PS. As a result, submarining may be suppressed. Therefore, the pelvis area L of the occupant P may be appropriately supported at usual times and the occupant P may be protected effectively during a forward movement collision.

Third Exemplary Embodiment

A vehicle seat structure according to a third exemplary embodiment of the present disclosure is described below using FIG. 5. Structural portions that are the same as in the first exemplary embodiment described above are assigned the same reference symbols, and descriptions thereof are not given.

A vehicle seat structure 90 according to the third exemplary embodiment is similar in basic structure to the first exemplary embodiment, but differs in that the pelvis area L of the occupant P is pushed by an airbag apparatus 92.

—Airbag Apparatus—

Figure 5:
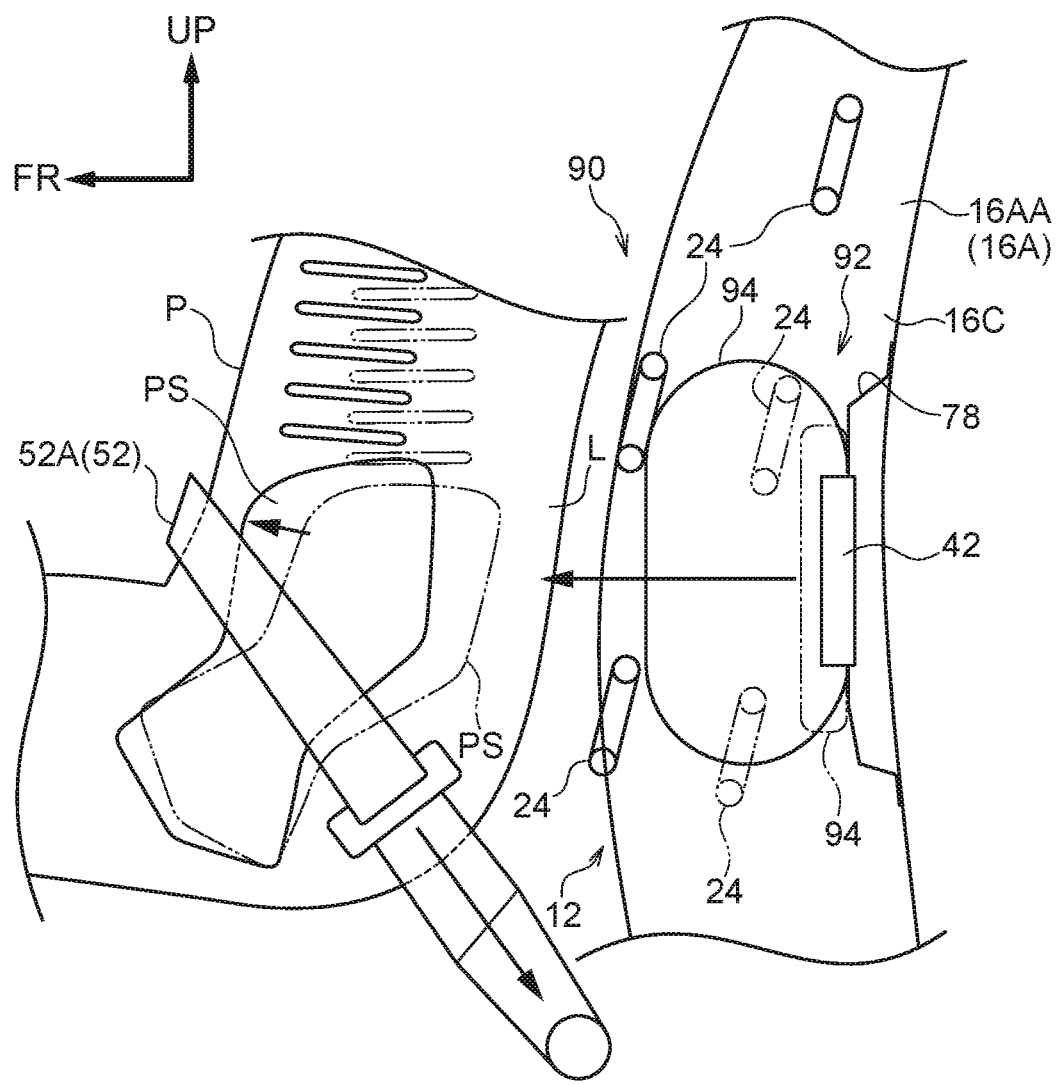
FIG. 5 is a schematic side view showing an operational state of a vehicle seat structure according to a third exemplary embodiment during a forward movement collision.

As shown in FIG. 5, the airbag apparatus 92 that serves as the pushing apparatus is provided at a predetermined height at the seatback frame 16A, and therefore the interior of the seatback 16 (see FIG. 1). The airbag apparatus 92 is provided between the left and right pair of side frames 16AA and includes the counterforce plate 78, the inflator 42, and an airbag 94 that serves as the pushing portion. The meaning of the term "predetermined height" at which the lumbar support mechanism 74 is disposed, is intended to include, for example, a position from which, when the airbag 94 of the airbag apparatus 92 inflates and expands, the airbag 94 pushes against the upper region of the pelvis bone PS of the pelvis area L of the occupant P.

The airbag 94 is fixed to the counterforce plate 78 in a state in which the airbag 94 is folded up and the inflator 42 is accommodated inside the airbag 94 (see the two-dot chain lines in FIG. 5). The airbag 94 is disposed at the seat rear side of the seat springs 24. Therefore, when the inflator 42 generates gas, the seat springs 24 are pushed by the airbag 94 inflating and expanding. Via the cushion member, which is not shown in the drawings, and seat cover provided at the seat forward side of the seatback 16, the seat springs 24 push the pelvis area L of the occupant P sitting on the vehicle seat 12 to the seat forward side.

Operation and Effects of the Third Exemplary Embodiment

Now, operation and effects of the third exemplary embodiment are described.

Because the structure described above is similar to the vehicle seat structure 10 according to the first exemplary embodiment except in the matter of the pelvis area L of the occupant P being pushed by the airbag apparatus 92, similar effects to the first exemplary embodiment are provided. In addition, when gas is supplied from the activated inflator 42 during a forward movement collision, the airbag 94 inflates and expands in the seatback 16. As a result, the airbag 94 pushes the portion of the front face 16B of the seatback 16 to the seat forward side. Therefore, the airbag 94 may push the upper portion of the pelvis area L of the occupant P to the seat forward side during the forward movement collision. Thus, the pelvis bone PS of the occupant P may be tilted forward, the lap belt 52A of the seatbelt 52 may be made less likely to slide off the pelvis bone PS, and submarining may be suppressed. Therefore, the occupant P may be protected effectively during a forward movement collision by a simple structure.

Fourth Exemplary Embodiment

A vehicle seat structure according to a fourth exemplary embodiment of the present disclosure is described below using FIG. 6 to FIG. 9. Structural portions that are the same as in the first exemplary embodiment described above are assigned the same reference symbols, and descriptions thereof are not given.

A vehicle seat structure 100 according to the fourth exemplary embodiment is similar in basic structure to the first exemplary embodiment, but differs in that an airbag 102 is exposed from the seatback 16 when the airbag 102 inflates and expands.

—Airbag Apparatus—

Figure 6:
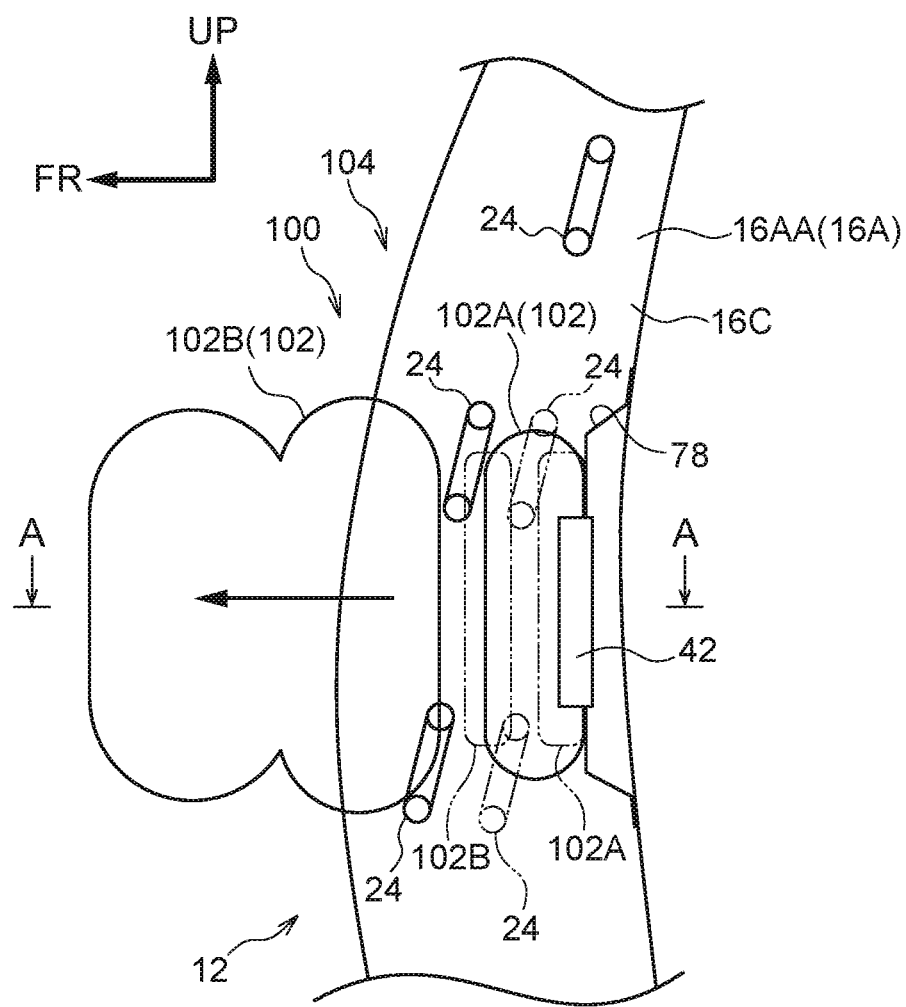
FIG. 6 is a schematic side view showing an operational state of a vehicle seat structure according to a fourth exemplary embodiment during a forward movement collision.

As shown in FIG. 6, an airbag apparatus 104 that serves as the pushing apparatus is provided at a predetermined height at the seatback frame 16A, and therefore the interior of the seatback 16 (see FIG. 1). The airbag apparatus 104 is provided between the left and right pair of side frames 16AA and includes the counterforce plate 78, the inflator 42, and the airbag 102 that serves as the pushing portion. The meaning of the term "predetermined height" at which the airbag apparatus 104 is disposed, is intended to include, for example, a position from which, when the airbag 102 of the airbag apparatus 104 inflates and expands, the airbag 102 pushes against the upper region of the pelvis bone PS of the pelvis area L of the occupant P (see FIG. 5).

The airbag 102 includes a first airbag 102A and a second airbag 102B. The first airbag 102A is fixed to the counterforce plate 78 in a state in which the first airbag 102A is folded up and the inflator 42 is accommodated inside the first airbag 102A (see the two-dot chain lines in FIG. 6). The first airbag 102A is disposed at the seat rear side of the seat springs 24.

Figure 7:
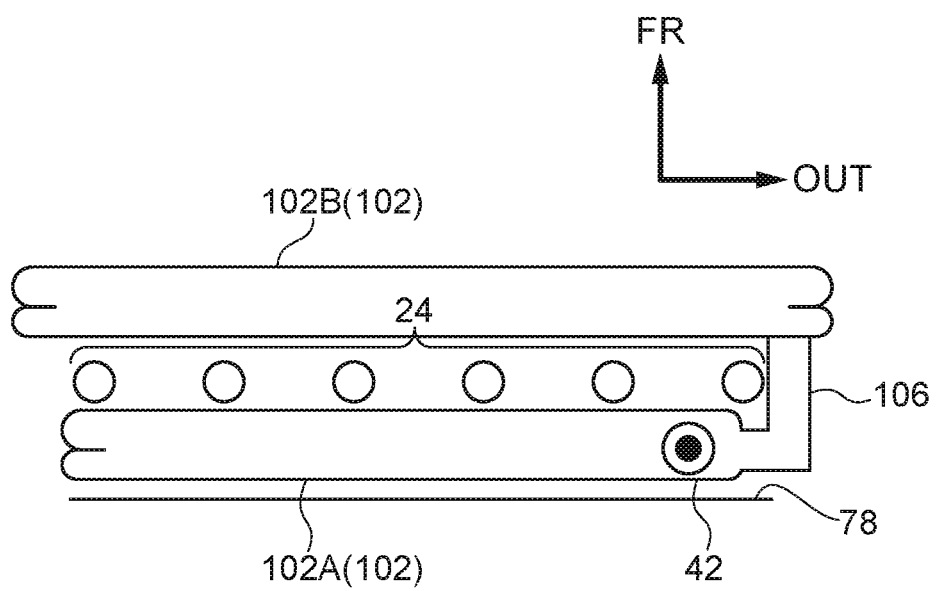
FIG. 7 is an enlarged sectional diagram showing a state cut along line A-A in FIG. 6.

As shown in FIG. 7, the second airbag 102B is provided at a seat forward side of the seat springs 24. The second airbag 102B is in fluid communication with the interior of the first airbag 102A via a gas duct portion 106. That is, the first airbag 102A and second airbag 102B are provided to oppose one another sandwiching the seat springs 24, and the gas from the inflator 42 is supplied to both the first airbag 102A and the second airbag 102B during inflation and expansion.

Figure 8:
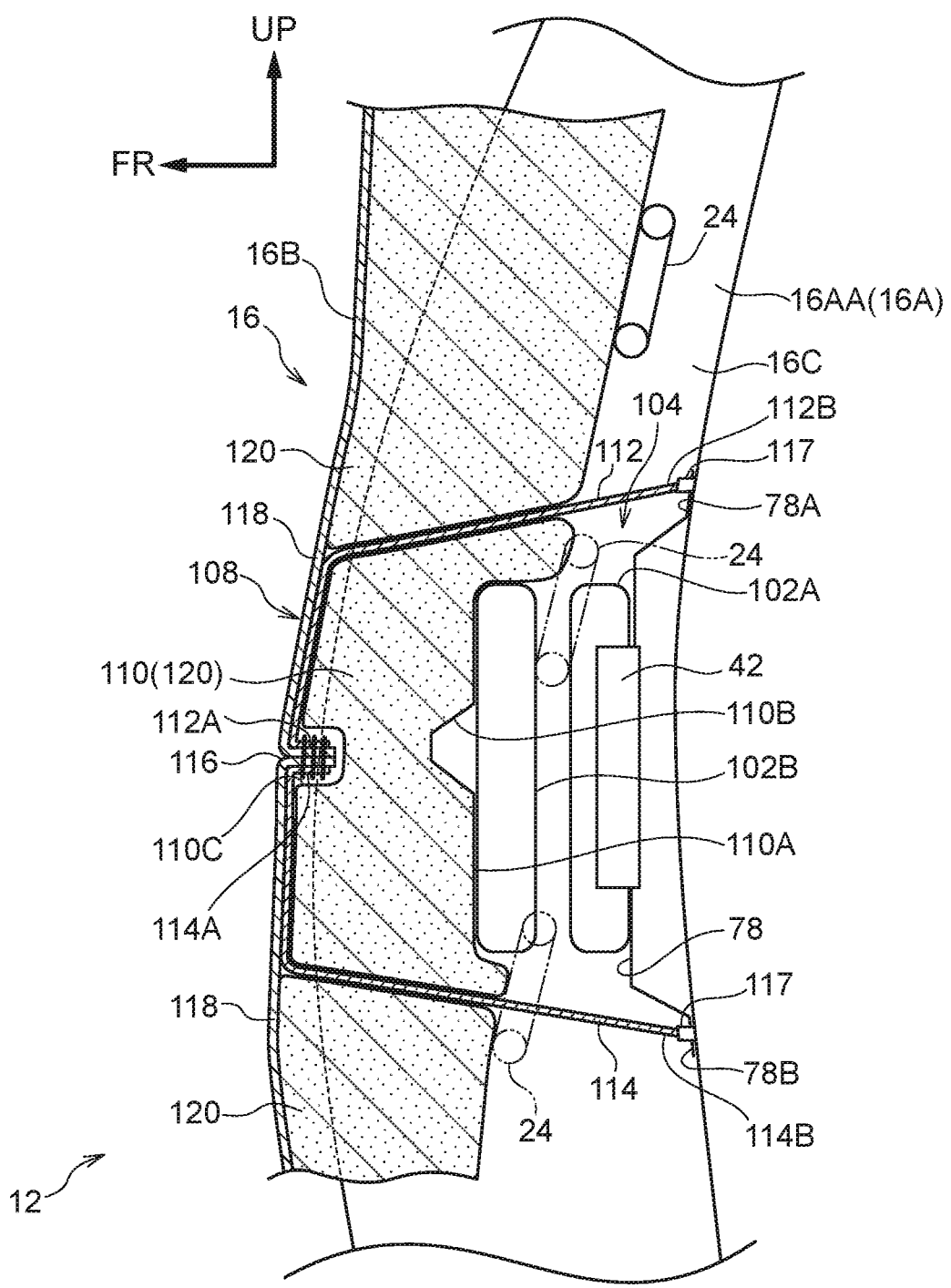
FIG. 8 is a magnified sectional view showing a state, seen in a vehicle side view, during usual operation of the vehicle seat structure according to the fourth exemplary embodiment.

As shown in FIG. 8, an airbag stowing structure 108 is provided at a region of the seatback 16 that corresponds with the airbag apparatus 104. The airbag stowing structure 108 includes a stowing portion pad 110, a first stay cloth 112, a second stay cloth 114 and a rupture portion 116. The stowing portion pad 110 constitutes a portion of a cushion member 120 of the seatback 16 and is disposed at a seat forward side of the airbag apparatus 104. An airbag stowing portion 110A is formed in a face at a seat rear side of the stowing portion pad 110. The airbag stowing portion 110A is formed in a shape that is recessed to the seat forward side. The second airbag 102B is stowed in the airbag stowing portion 110A in a state in which the second airbag 102B is folded up. A cleavage start point 110B is formed substantially at the middle in the seat vertical direction of the airbag stowing portion 110A of the stowing portion pad 110. The cleavage start point 110B is provided at a position substantially matching the rupture portion 116 in the seat vertical direction. The cleavage start point 110B is formed in a shape that is recessed toward the seat forward side. In other words, in a seat side view, the thickness of the stowing portion pad 110 in the seat front-and-rear direction is specified to be thinner in a region corresponding with the cleavage start point 110B than in other regions. Hence, during inflation and expansion, the cleavage start point 110B is subject to inflation and expansion pressure from the first airbag 102A, and the stowing portion pad 110 may be cleaved starting from the cleavage start point 110B.

The rupture portion 116 is provided substantially at the middle in the seat vertical direction of the stowing portion pad 110, at the seat forward side of the stowing portion pad 110. The rupture portion 116 is formed by one seat cover 118 and another seat cover 118 that are separate in the seat vertical direction being sewn together. A sewn portion accommodation portion 110C is formed in a region of the stowing portion pad 110 that corresponds with the rupture portion 116. The sewn portion accommodation portion 110C is formed in a shape that is recessed toward the seat rear side. The seat covers 118 that are sewn together at the rupture portion 116 are accommodated in the sewn portion accommodation portion 110C.

The first stay cloth 112 and second stay cloth 114, which are more resistant to stretching than the seat covers 118, are also sewn together with the rupture portion 116. An end portion 112A at the seat forward side of the first stay cloth 112 is sewn together with the rupture portion 116. An end portion 112B at the seat rear side of the first stay cloth 112 is attached to a seat upper side edge portion 78A of the counterforce plate 78 via a metal fixing piece 117. The first stay cloth 112 extends from the end portion 112A to the counterforce plate 78 along the seat forward side of the stowing portion pad 110 and a side face at the seat upper side of the stowing portion pad 110.

Figure 9:
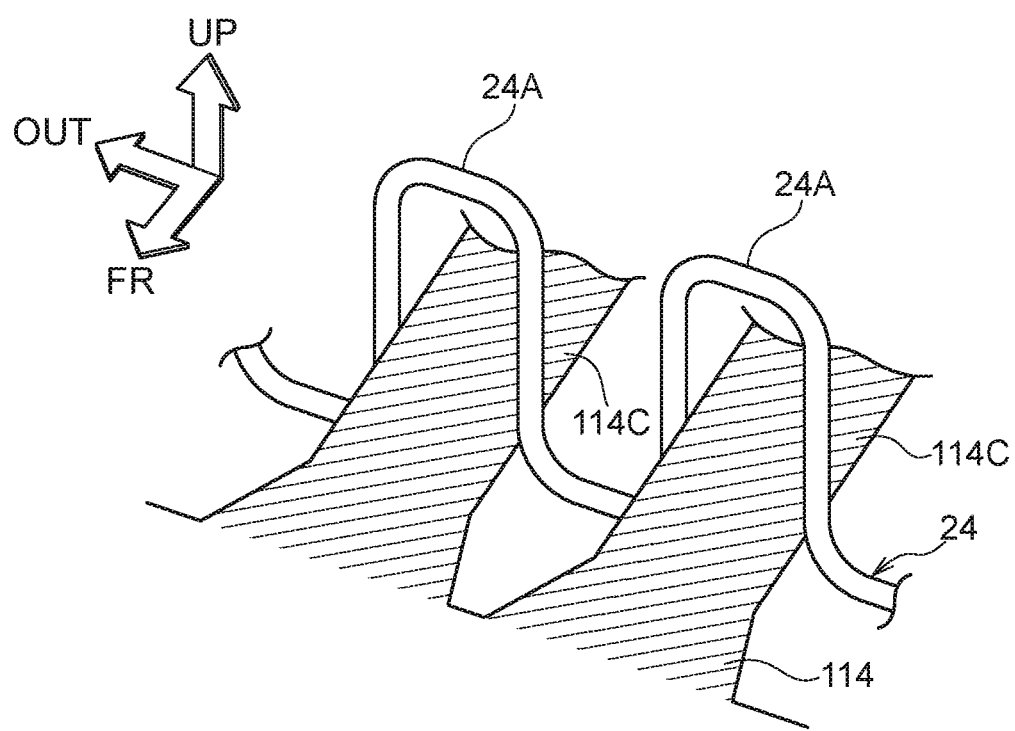
FIG. 9 is a schematic perspective view showing a relationship between a stay cloth and a seat spring of the vehicle seat structure according to the fourth exemplary embodiment.

An end portion 114A at the seat forward side of the second stay cloth 114 is sewn together with the rupture portion 116. An end portion 114B at the seat rear side of the second stay cloth 114 is attached to a seat lower side edge portion 78B of the counterforce plate 78 via another of the metal fixing piece 117. The second stay cloth 114 extends from the end portion 114A to the counterforce plate 78 along the seat forward side of the stowing portion pad 110 and a side face at the seat lower side of the stowing portion pad 110. As shown in FIG. 9, plural portions 114C are provided at the second stay cloth 114, in a region at the seat rear side relative to the seat springs 24. A seat width direction dimension of each portion 114C is specified to be smaller than a seat width direction dimension within each of plural meander portions 24A of the seat spring 24. The portions 114C are inserted into the meander portions 24A. Consequently, the second stay cloth 114 does not impede movements of the seat springs 24.

Operation and Effects of the Fourth Exemplary Embodiment

Now, operation and effects of the fourth exemplary embodiment are described.

Because the structure described above is similar to the vehicle seat structure 10 according to the first exemplary embodiment except in the matter of the airbag 102 being exposed from the seatback 16 during inflation and expansion, similar effects to the first exemplary embodiment are provided. In addition, the rupture portion 116 is provided at a region of the front face of the seatback 16 that corresponds with the airbag apparatus 104 provided at the predetermined height. The rupture portion 116 is pressed by the airbag 102 during inflation and expansion, and cleaves. Because the airbag 102 emerges to the seat forward side of the seatback 16 through the rupture portion 116 during the inflation and expansion, the inflating and expanding airbag 102 directly pushes the upper portion of the pelvis area L of the occupant P to the seat forward side. Thus, because the airbag 102 pushes the pelvis area of the occupant directly without the front face 16B of the seatback 16 being interposed, a displacement amount (stroke) of the airbag 102 when pushing against the pelvis area may be increased. Therefore, a movement amount of the pelvis area L of the occupant P during the pushing may be increased. Even in a case in which the occupant P sits in a relaxed state in which the seatback 16 is greatly reclined to the seat rear side, as an example, at more than 36° from the vertical, the pelvis bone PS of the occupant P may be returned to a state close to a driving posture, as an example, in which the seatback 16 is tilted 21° to the rear side from the vertical. That is, the pelvis bone PS of the occupant P in the relaxed state is moved in a forward-tilting direction, the lap belt 52A of the seatbelt 52 is made less likely to slide off the pelvis, and submarining may be suppressed. Thus, an occupant sitting on the vehicle seat in a relaxed state may be protected effectively during a forward movement collision.

The airbag 102 includes the first airbag 102A and the second airbag 102B. The first airbag 102A is provided at the seat rear side of the seat springs 24. Meanwhile, the second airbag 102B is provided at the seat forward side of the seat springs 24. Therefore, when the first airbag 102A inflates and expands, the second airbag 102B inflates and expands in a state that is displaced to the seat forward side via the seat springs 24. Hence, a displacement amount when second airbag 102B pushes the upper portion of the pelvis area L of the occupant P may be increased further. Because the movement amount of the pelvis area L during the pushing may be increased further, the pelvis bone PS of an occupant P sitting in the relaxed state may be returned to a state that is even closer to the driving posture. That is, the pelvis bone PS of the occupant P in the relaxed state is moved greatly in the forward-tilting direction, the lap belt 52A of the seatbelt 52 is made less likely to slide off the pelvis, and submarining may be suppressed. Thus, an occupant P sitting on the vehicle seat 12 in a relaxed state may be protected even more effectively during a forward movement collision.

As shown in FIG. 8, the end portion 112A of the first stay cloth 112 and the end portion 114A of the second stay cloth 114 are sewn together at the rupture portion 116. During inflation and expansion of the first airbag 102A and the second airbag 102B, the first stay cloth 112 is subject to inflation and expansion pressure toward the seat upper side from the first airbag 102A and the second airbag 102B, and the second stay cloth 114 is subject to inflation and expansion pressure toward the seat lower side from the first airbag 102A and the second airbag 102B. Thus, at the rupture portion 116, the first stay cloth 112 may apply tension toward the seat upper side and the second stay cloth 114 may apply tension toward the seat lower side. As a result, the rupture portion 116 may be cleaved and the second airbag 102B exposed from inside the seatback 16 at an early timing.

In the present exemplary embodiment, the first airbag 102A and the second airbag 102B are provided to oppose one another sandwiching the seat springs 24, but this is not limiting. The first airbag 102A and second airbag 102B may be provided to oppose one another sandwiching the lumbar plate 30 of the lumbar support mechanism 26 or 74. In this situation, the first stay cloth 112 and second stay cloth 114 are provided with slackness in the seat front-and-rear direction so as to allow movement of the lumbar plate 30. Thus, the pelvis area L of the occupant P sitting on the vehicle seat 12 may be supported in an appropriate sitting position by the lumbar plate 30 at usual times. Then, when the first airbag 102A and second airbag 102B are inflated and expanded during a forward movement collision, the pelvis bone PS of the occupant P may be moved greatly in a forward-tilting direction.

In the first to fourth exemplary embodiments described above, the seat forward side of the vehicle seat 12 substantially coincides with the vehicle forward side, but this is not limiting. In an autonomous driving vehicle or the like, the seat forward side may be set to an orientation other than the vehicle forward side. In this situation, the meaning of the term "during a forward movement collision" includes a collision mode other than a vehicle frontal collision in which an occupant sitting in the orientation of the vehicle seat 12 moves to the seat forward side during the collision. If the seat forward side of the vehicle seat 12 substantially coincides with the vehicle rear side, an occupant sitting in the orientation of the vehicle seat 12 moves to the seat forward side in a rear collision.

Exemplary embodiments of the present disclosure are described hereabove. However, the present disclosure is not limited by these descriptions and it will be clear that numerous modifications beyond these descriptions may be embodied not departing from the scope of the present disclosure.

What is claimed is:

1. A vehicle seat structure comprising:
   a vehicle seat including a seat cushion and a seatback; and
   a pushing apparatus provided inside the seatback at a predetermined height, the pushing apparatus including a pushing portion that, at a time of a vehicle collision in which an occupant sitting on the vehicle seat moves to a seat forward side, pushes a portion of a seat front face of the seatback to the seat forward side, wherein:
   the pushing apparatus includes a rod member and an inflator,
   the pushing portion is capable of pushing the portion of the seat front face of the seatback to the seat forward side at a usual time, and
   in a case in which gas is supplied from the inflator that is activated at the time of the vehicle collision, the rod member moves to the seat forward side and causes the pushing portion to push the portion of the seat front face of the seatback further to the seat forward side than at the usual time.

2. A vehicle seat structure comprising:
a vehicle seat including a seat cushion and a seatback; and
a pushing apparatus provided inside the seatback at a predetermined height, the pushing apparatus including a pushing portion that, at a time of a vehicle collision in which an occupant sitting on the vehicle seat moves to a seat forward side, pushes a portion of a seat front face of the seatback to the seat forward side, wherein:
the pushing apparatus includes an airbag as the pushing portion, and the airbag inflates and expands in the seatback when gas is supplied thereto from an inflator that is activated at the time of the vehicle collision, and
a rupture portion is provided at a portion of the seat front face of the seatback, the portion corresponding with the height of the pushing apparatus, the rupture portion cleaving when pushed by the airbag during the inflation and expansion, and the airbag emerging through the rupture portion to the seat forward side of the seatback during the inflation and expansion.

3. The vehicle seat structure according to claim 2, wherein the airbag includes a first airbag and a second airbag, the first airbag and second airbag being disposed to oppose one another substantially in a seat front-and-rear direction prior to the inflation and expansion, the first airbag being provided at a seat rear side of a seat spring that is provided in the seatback and extends in a seat width direction, and the second airbag being provided at the seat forward side of the seat spring.

4. A vehicle seat structure comprising:
a vehicle seat including a seat cushion and a seatback; and
a lumbar support mechanism provided inside the seatback at a predetermined height, the lumbar support mechanism including a lumbar plate that is capable of pushing a front face of the seatback to a seat forward side, the lumbar plate being configured to support the pelvis area of an occupant sitting on the vehicle seat at a usual time, and the lumbar plate pushing a portion of the seat front face of the seatback to the seat forward side so as to push the pelvis area of the occupant at a time of a vehicle collision in which the occupant moves to a seat forward side, wherein:
the lumbar plate is rotatable about an axial direction that is along a vehicle width direction, and the lumbar plate is configured to be moved further to upper side than at the usual time and to push the portion of the front face of the seatback further to the seat forward side than at the usual time in a case in which gas is supplied from an activated inflator during the forward movement collision.

5. The vehicle seat structure according to claim 4, the lumbar support mechanism including a lumbar rod to which the lumbar plate is attached,
wherein the lumbar plate pushes the portion of the front face of the seatback further to the seat forward side by the lumbar rod that is moved to a seat forward side by the gas that is supplied from the activated inflator during the forward movement collision.

6. The vehicle seat structure according to claim 4, the lumbar support mechanism including a gear driving mechanism,
wherein the lumbar plate is rotated by the gear driving mechanism that is moved downwardly by the gas that is supplied from the activated inflator during the forward movement collision.

7. The vehicle seat structure according to claim 5, the lumbar support mechanism including a gear driving mechanism,
wherein the lumbar rod is moved to the seat forward side by the gear driving mechanism that is moved downwardly by the gas that is supplied from the activated inflator during the forward movement collision.

8. The vehicle seat structure according to claim 4, the lumbar support mechanism including an airbag,
wherein the lumbar plate is rotated by the airbag that is inflated within the seatback by the gas that is supplied from the activated inflator during the forward movement collision.

9. The vehicle seat structure according to claim 5, the lumbar support mechanism including an airbag,
wherein the lumbar rod is moved to the seat forward side by the airbag that is inflated within the seatback by the gas that is supplied from the activated inflator during the forward movement collision.

* * * * *